US008538275B2

(12) United States Patent
Essiambre et al.

(10) Patent No.: US 8,538,275 B2
(45) Date of Patent: Sep. 17, 2013

(54) MULTIMODE OPTICAL COMMUNICATION

(75) Inventors: Rene'-Jean Essiambre, Red Bank, NJ (US); Christopher R. Doerr, Middletown, NJ (US); Roland Ryf, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 377 days.

(21) Appl. No.: 12/827,641

(22) Filed: Jun. 30, 2010

(65) Prior Publication Data
US 2011/0243574 A1 Oct. 6, 2011

Related U.S. Application Data
(60) Provisional application No. 61/321,013, filed on Apr. 5, 2010, provisional application No. 61/320,934, filed on Apr. 5, 2010.

(51) Int. Cl.
*H04B 10/04* (2011.01)
*H04B 10/12* (2011.01)

(52) U.S. Cl.
USPC .......................................... 398/201; 398/143

(58) Field of Classification Search
USPC .............. 398/44, 82, 141–143, 201
See application file for complete search history.

(56) References Cited

U.S. PATENT DOCUMENTS

| 5,379,142 | A   | 1/1995  | Handa |
| 6,525,853 | B1  | 2/2003  | Stuart |
| 6,668,108 | B1  | 12/2003 | Helkey et al. |
| 6,797,983 | B2  | 9/2004  | Chen et al. |
| 6,801,687 | B2 * | 10/2004 | Pierce ............................. 385/28 |
| 6,868,236 | B2 * | 3/2005  | Wiltsey et al. ................ 398/183 |
| 6,909,528 | B2  | 6/2005  | Korzinin et al. |
| 6,940,577 | B2  | 9/2005  | Kozhukh |
| 7,194,155 | B1  | 3/2007  | Kahn et al. |
| 7,268,852 | B2  | 9/2007  | Kuan et al. |
| 7,315,575 | B2  | 1/2008  | Sun et al. |
| 7,323,275 | B2  | 1/2008  | Otaki et al. |
| 7,327,914 | B1  | 2/2008  | Kahn et al. |
| 7,376,356 | B2  | 5/2008  | Madsen |
| 7,416,818 | B2  | 8/2008  | Sutherland et al. |

(Continued)

FOREIGN PATENT DOCUMENTS
GB   2 399 963 A   9/2004

OTHER PUBLICATIONS
PCT International Search Report, PCT/US2011/030248, Filing Date Mar. 29, 2011, Mailed Oct. 12, 2011.

(Continued)

*Primary Examiner* — Dalzid Singh
(74) *Attorney, Agent, or Firm* — J. F. M^cCabe

(57) ABSTRACT

An optical transmitter includes a set of optical waveguides and first, second, and third optical modulators. Output ends of the optical waveguides of the set form a two-dimensional array capable of end-coupling the optical waveguides of the set to a multimode optical fiber in response to the array being located to optically face one end of the multimode optical waveguide. The first optical modulator is optically connected to a first of the optical waveguides of the set, and each of the second and third optical modulators is optically connected to the second and third of the optical waveguides of the set. The set of optical waveguides is configured to provide a coupling matrix of rank three or more between the optical modulators and optical propagation modes in the multimode optical fiber.

20 Claims, 14 Drawing Sheets

(56) References Cited

U.S. PATENT DOCUMENTS

| | | | |
|---|---|---|---|
| 7,674,028 B2 | 3/2010 | Cassarly et al. | |
| 7,844,144 B2 | 11/2010 | Kahn et al. | |
| 7,864,820 B2* | 1/2011 | Shimotsu | 372/6 |
| 2002/0003923 A1 | 1/2002 | Ranka et al. | |
| 2002/0033987 A1 | 3/2002 | Fuse et al. | |
| 2003/0030868 A1 | 2/2003 | Sasai et al. | |
| 2003/0103718 A1 | 6/2003 | Chen | |
| 2004/0264973 A1 | 12/2004 | Bremner et al. | |
| 2005/0046865 A1 | 3/2005 | Brock et al. | |
| 2005/0213075 A1 | 9/2005 | Cooke | |
| 2007/0247687 A1 | 10/2007 | Handschy et al. | |
| 2007/0297806 A1 | 12/2007 | Kaneda et al. | |
| 2008/0069561 A1 | 3/2008 | Kahn et al. | |
| 2008/0273560 A1 | 11/2008 | Stelmakh | |
| 2009/0129787 A1 | 5/2009 | Li et al. | |
| 2009/0169220 A1 | 7/2009 | Kahn et al. | |
| 2009/0244415 A1 | 10/2009 | Ide | |
| 2010/0138722 A1 | 6/2010 | Harley et al. | |
| 2010/0142971 A1 | 6/2010 | Chang et al. | |
| 2010/0158521 A1 | 6/2010 | Doerr et al. | |
| 2010/0290738 A1 | 11/2010 | Yan et al. | |
| 2010/0296819 A1 | 11/2010 | Kahn et al. | |
| 2010/0329670 A1* | 12/2010 | Essiambre et al. | 398/43 |
| 2010/0329671 A1 | 12/2010 | Essiambre et al. | |
| 2010/0329693 A1* | 12/2010 | Chen | 398/147 |
| 2011/0150503 A1 | 6/2011 | Winzer | |
| 2011/0243490 A1 | 10/2011 | Ryf | |
| 2011/0243574 A1 | 10/2011 | Essiambre et al. | |

OTHER PUBLICATIONS

R-J Essiambre et al, "Transverse-Mode Multiplexing for Optical Communication Systems," U.S. Appl. No. 12/492,399, filed Jun. 26, 2009, 49 pgs.

R-J Essiambre et al, "Receiver for Optical Transverse-Mode-Multiplexed Signals," U.S. Appl. No. 12/492,391, filed Jun. 26, 2009, 51 pgs.

Roland Ryf, "Waveguide Coupler For Optical Transverse-Mode Multiplexing," U.S. Appl. No. 12/827,284, filed Jun. 30, 2010, 30 pgs.

C. Doerr et al, "Optical Mixer for Coherent Detection of Polarization-Multiplexed Signals," U.S. Appl. No. 12/338,492, filed Dec. 18, 2008, 21 pgs.

D. Gloge, "Weakly Guiding Fibers", Applied Optics, vol. 10, No. 10, Oct. 1971, pp. 2252-2258.

M.G. Robinson, J. Chen , G.D. Sharp, "Polarization Engineering for LCD Projection", J. Wiley & Sons, Ltd., Chichester (England), 2005, Chapter 11, pp. 257-275.

Rick C.J. Hsu et al., "Capacity Enhancement in Coherent Optical MIMO (COMIMO) Multimode Fiber Links", IEEE Communications Letters, vol. 10, No. 3, Mar. 2006, pp. 195-197.

A. Tarighat et al., "Fundamentals and Challenges of Optical Multiple-Output Multimode Fiber Links", Topics in Optical Communications, IEEE Communications Magazine, May 2007, pp. 57-63.

Rick C.J. Hsu et al., "Coherent Optical Multiple-Input Multiple-Output communication", IEICE Electronics Express, vol. 1, No. 13, 2004, pp. 392-397.

A.R. Shah et al., "Coherent Optical MIMO (COMIMO)", Journal of Lightwave Technology, vol. 23, No. 8, Aug. 2005, pp. 2410-2419.

William Shieh, "High Spectral Efficiency Coherent Optical OFDM for 1 Tb/s Ethernet Transport", OWW1.pdf, OSA/OFC/NFOEC, San Diego, CA, 2009, 3 pgs.

Y-K Chen et al, "Coherent Phase-Shift-Keying", U.S. Appl. No. 11/204,607, filed Aug. 15, 2005, 33 pgs.

Y-K Chen et al, "Optical Heterodyne Receiver and Method Of Extracting Data From A Phase-Modulated Input Optical Signal", U.S. Appl. No. 11/236,246, filed Sep. 27, 2005, 39 pgs.

Y-K Chen et al, "Frequency Estimation In An Intradyne Optical Receiver", U.S. Appl. No. 11/644,536, filed Dec. 22, 2006, 29 pgs.

Jalali et al., "Coherent Optical MIMO", 2005; Proc. of SPIE; vol. 5814; pp. 121-127.

O'Callaghan et al., "Spatial Light Modulators with Integrated Phase Masks for Holographic Data Storage", 2006; IEEE; pp. 23-25.

Lin et al., "Holographic Fabrication of Photonic Crystals Using Multidimensional Phase Masks", Dec. 2008; Journal of Applied Physics.

Stuart, H., "Dispersive Multiplexing in Multimode Optical Fiber", 2000; Science Magazine, pp. 281-283.

"Fourier optics", Wikipedia, the free encyclopedia, "http://en.wikipedia.org/wiki/Fourier_optics", downloaded Aug. 31, 2011, 20 pgs.

Gioge, D., "Weakly Guiding Fibers", Applied Optics, vol. 10, No. 10, Oct. 1971, pp. 2252-2258.

Robinson, M. G. et al., "Single and Dual Panel LC Projection Systems", Wiley, Chichester (England), 2005, Chapter 11, pp. 257-275.

Hsu, Rick C. J. et al., "Capacity Enhancement in Coherent Optical MIMO (COMIMO) Multimode Fiber Links", IEEE Communications Letters, vol. 10, No. 3, Mar. 2006, pp. 195-197.

Tarighat, Alireza et al., "Fundamentals and Challenges of Optical Multiple-Input Multiple-OUtput Multimode Fiber Links", Topics in Optical Communications, IEEE Communications Magazine, May 2007, pp. 57-63.

Hsu, Rick C. J. et al., "Coherent Optical Multiple-Input Multiple-Output communication", IEICE Electronics Express, vol. 1, No. 13, 2004, pp. 392-397.

Shah, Akhil R. et al., "Coherent Optical MIMO (COMIMO)", Journal of Lightwave Technology, vol. 23, No. 8 Aug. 2005, pp. 2410-2419.

Shieh, William, "High Spectral Efficiency Coherent Optical OFDM for 1 Tb/s Ethernet Transport", OWW1.pdf, OCIA codes: (060 2330) Fiber optics communications; (060. 1660) Coherent Communications, 2009, 3 pages.

Guofeng, Wu, "Methods of Increasing the Bandwidth-Distance Product for Multimode Fibers in LAN", Journal of Optical Communications, vol. 29, Jan. 1, 2008, pp. 213-216.

Essiambre Rene'-Jean et al., "Transverse-Mode Multiplexing for Optical Communication Systems", U.S. Appl. No. 12/492,399, filed Jun. 26, 2009.

Essiambre Rene'-Jean et al., "Receiver for Optical Transverse-Mode-Multiplexed Signals", U.S. Appl. No. 12/492,391, filed Jun. 26, 2009.

\* cited by examiner

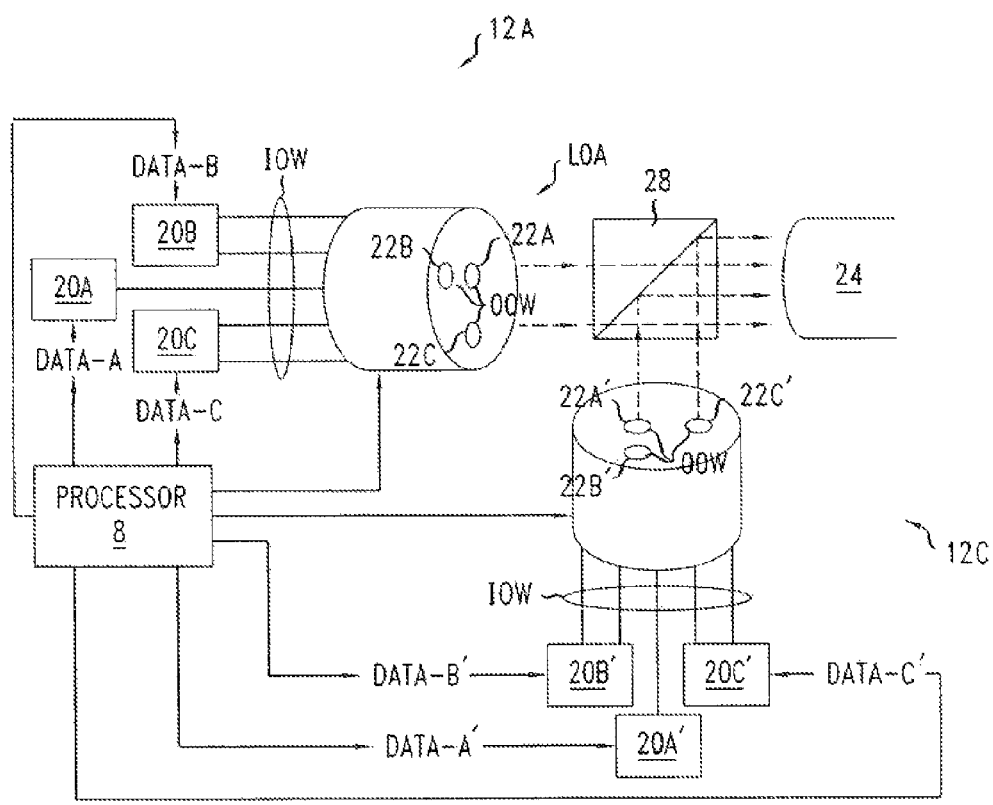

MULTIMODE OPTICAL COMMUNICATION

This application claims the benefit of U.S. provisional application No. 61/321,013, filed Apr. 5, 2010, and claims the benefit of U.S. provisional application No. 61/320,934, filed Apr. 5, 2010.

BACKGROUND

1. Technical Field

The inventions relate to optical communication systems.

2. Discussion of the Related Art

This section introduces aspects that may be helpful to facilitating a better understanding of the inventions. Accordingly, the statements of this section are to be read in this light and are not to be understood as admissions about what is in the prior art or what is not in the prior art.

In various communication systems, an important consideration is the data transmission rate. In the context of optical communications several techniques are possible for increasing the data transmission rate. Those techniques include phase-shift keying, polarization multiplexing, and optical propagation mode multiplexing.

BRIEF SUMMARY

One embodiment of an apparatus includes an optical transmitter. The optical transmitter includes a set of optical waveguides and first, second, and third optical modulators. Output ends of the optical waveguides of the set form a two-dimensional (2D) lateral input array capable of end-coupling the optical waveguides of the set to a multimode optical fiber in response to the array being located to optically face one end of the multimode optical waveguide. The first optical modulator is optically connected to a first of the optical waveguides of the set, and each of the second and third optical modulators is optically connected to the second and third of the optical waveguides of the set. The set of optical waveguides is configured to provide a coupling matrix of rank three or more between the optical modulators and optical propagation modes in the multimode optical fiber.

In some embodiments of the above apparatus, the set includes first and second optical fiber bundles. The second and third optical waveguides of the set are optical fibers of the first and second optical fiber bundles, respectively.

In some embodiments of the above apparatus, the set includes first and second multicore optical fibers. The first and second optical waveguides of the set are optical fibers of the first and second multicore optical fibers, respectively.

In some embodiments of the above apparatus, the set of optical waveguides includes at least five optical waveguides whose output ends form the 2D lateral output array capable of end-coupling the optical waveguides of the set to the multimode optical fiber.

In some embodiments of the above apparatus, the optical transmitter further includes a second set of optical waveguides and first, second, and third additional optical modulators. Output ends of the optical waveguides of the second set form a second 2D lateral input array capable of end-coupling the optical waveguides of the second set to a multimode optical fiber in response to the second array being located to optically face an end of the multimode optical waveguide. The first additional optical modulator is optically connected to a first of the optical waveguides of the second set, and each of the second and third additional optical modulators is optically connected to the second and third of the optical waveguides of the second set. In some such embodiments, the two arrays may form a single physical array with the outputs of the optical waveguides of both sets. In some such embodiments, the second set of optical waveguides may be configured to provide a coupling matrix of rank three or more between the additional optical modulators and optical propagation modes in the multimode optical fiber. In some such embodiments, the first set and the optical modulators connected thereto may be configured to output light to the multimode optical fiber with a polarization substantially orthogonal to a polarization of light that the second set and the additional optical modulators are configured to output thereto.

Another embodiment of an apparatus includes optical receiver. The optical receiver includes a set of optical waveguides and first, second, and third optical data demodulators. Input ends of the optical waveguides of the set form a 2D lateral input array for end-coupling the optical waveguides of the set to a multimode optical fiber in response to the array being located to optically face one end of the multimode optical waveguide. The first optical data demodulator is optically connected to a first of the optical waveguides of the set, and each of the second and third optical data demodulators is optically connected to the second and third of the optical waveguides of the set. The set of optical waveguides is configured to provide a coupling matrix or rank three or more between the optical data demodulators and optical propagation modes in the multimode optical fiber.

In some embodiments of the above apparatus, the set includes first and second optical fiber bundles. The second and third optical waveguides of the set are optical fibers of the first and second optical fiber bundles, respectively.

In some embodiments of the above apparatus, the set includes first and second multicore optical fibers. The first and second optical waveguides of the set are optical fibers of the first and second multicore optical fibers, respectively.

In some embodiments of the above apparatus, the set of optical waveguides includes at least five optical waveguides whose input ends form the 2D lateral input array capable of end-coupling the optical waveguides of the set to the multimode optical fiber.

In some embodiments of the above apparatus, the optical receiver further includes a second set of optical waveguides and first, second, and third additional optical data demodulators. Input ends of the optical waveguides of the second set form a second 2D lateral input array capable of end-coupling the optical waveguides of the second set to a multimode optical fiber in response to the second array being located to optically face an end of the multimode optical waveguide. The first additional optical data demodulator is optically connected to a first of the optical waveguides of the second set. Each of the second and third additional optical data demodulators is optically connected to the second and third of the optical waveguides of the second set. In some such embodiments, the two arrays form a single physical array with the inputs of the optical waveguides of both sets. In some such embodiments, the second set of optical waveguides is configured to provide a coupling matrix or rank three or more between the additional optical data demodulators and optical propagation modes in the multimode optical fiber. In some such embodiments, the first set and the optical data demodulators connected thereto are configured to receive light from the multimode optical fiber with a polarization substantially orthogonal to a polarization of light that the second set and the additional optical modulators are configured to receive from the multimode optical fiber.

Another embodiment provides a method of optically transmitting digital data. The method includes transmitting a first data modulated optical carrier to a first optical waveguide that is end-coupled to a multimode optical fiber such that the first modulated optical carrier is transmitted preferentially to a first propagation mode of the multimode optical fiber. The method includes transmitting second and third modulated optical carriers to both second and third optical waveguides that are end-coupled to the multimode optical waveguide such that the second modulated optical carrier is transmitted preferentially to a second propagation mode of the multimode optical fiber and the third modulated optical carrier is transmitted preferentially to a third propagation mode of the multimode optical fiber. The first, second and third propagation modes are orthogonal propagation modes in the multimode optical fiber.

In some embodiments of the method, the second propagation mode has a phase that increases as a circle about the axis of the multimode optical fiber is traversed in one direction, and the third propagation mode has a phase that increases as the circle is traversed in an opposite direction.

Another embodiment provides a method of optically receiving digital data. The method includes demodulating data from light received from a multimode optical waveguide via a first optical waveguide end-coupled thereto such that the received light is preferentially from a first propagation mode of the multimode optical waveguide. The method includes demodulating data from other light received from the multimode optical waveguide via both second and third optical waveguides end-coupled thereto such that the other light is preferentially from a second propagation mode of the multimode optical waveguide. The method includes demodulating data from yet other light received from the multimode optical waveguide via both the second and third optical waveguides such that the yet other light is preferentially from a third propagation mode of the multimode optical waveguide. The first, second and third propagation modes are orthogonal propagation modes in the multimode optical fiber.

In some embodiments of the method, the second propagation mode has a phase that increases on a circle about the axis of the multimode optical fiber as circle is swept out in one manner, and the third propagation mode has a phase that increases on the circle about the axis of the multimode optical fiber as circle is swept out in an opposite manner.

BRIEF DESCRIPTION OF THE DRAWINGS

FIG. 3C schematically illustrates a specific embodiment of the optical transmitter of FIG. 3A that also implements polarization mode multiplexing, e.g., for use in the optical communication system of FIG. 1;

In the Figures and text, like reference symbols indicate elements with similar or the same function and/or structure.

In the Figures, the relative dimension(s) of some features may be exaggerated to more clearly illustrate the feature(s) and/or relation(s) to other feature(s) therein.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

U.S. Provisional Applications 61/321,013 and 61/320,934, filed Apr. 5, 2010, and the U.S. patent application Ser. No. 12/827,284, titled "WAVEGUIDE COUPLER FOR OPTICAL TRANSVERSE-MODE MULTIPLEXING", filed by Roland Ryf on Jun. 30, 2010, are all incorporated by reference herein in their entirety.

Figure 1:
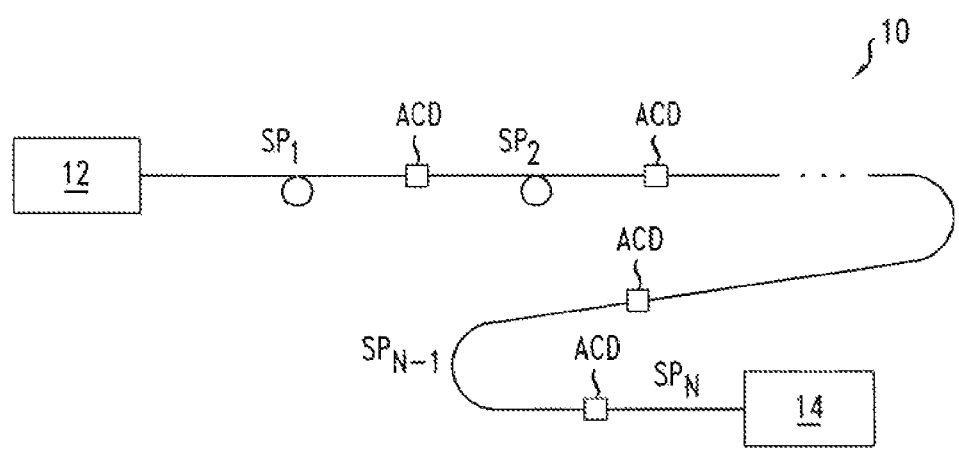
FIG. 1 schematically illustrates an optical communication system for communicating data according to optical propagation mode multiplexing (OPMM)

FIG. 1 illustrates ah optical communication system 10 for transmitting digital data according to optical propagation mode multiplexing (OPMM). The optical communication system 10 includes an optical transmitter 12, an optical receiver 14, and N transmission fiber spans $SP_1, SP_2, \ldots, SP_N$ of multimode optical transmission fiber that all-optically connect the optical transmitter 12 to the optical receiver 14. Here, N is a positive integer, e.g., 1, 2, 3, 4, etc., and each transmission fiber span $SP_1$-$SP_{N-1}$ of multimode optical transmission fiber is connected to the next span $SP_2$-$SP_N$ of multimode optical transmission fiber by a passive or active all-optical connection device (ACD). Examples of all-optical connection devices include optical amplifiers, optical dispersion compensators, optical fiber couplers, optical isolators, and/or serial combinations thereof.

Each all-optical connection device, ACD, effectively couples input and output transmission fiber spans $SP_1$-$SP_N$ via an optical coupling matrix. In the optical communication system 10, the all-optical connection devices, ACD, provide optical coupling matrices whose ranks are, at least, as large as the number of optical propagation modes used to carry independent data in the transmission fiber spans $SP_1$-$SP_N$. The rank of an optical coupling matrix fixes the number of independently modulated optical carriers that may coupled via a corresponding optical device at a fixed wavelength. The all-optical connection devices, ACD, may provide, e.g., substantially diagonal or non-diagonal coupling matrices between the data-carrying optical propagation modes to substantially conserve the form of the optical propagation mode carrying each individual data stream.

Figure 2A:
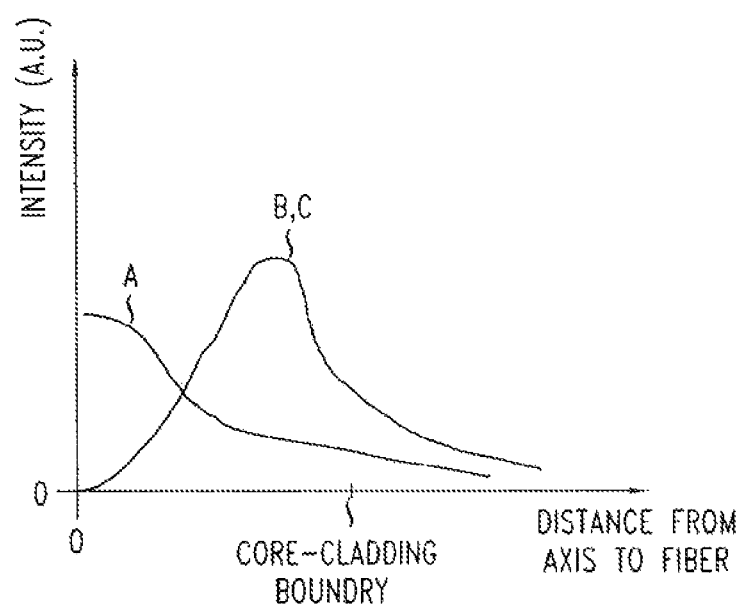
FIG. 2A schematically illustrates radial light intensities of three examples of optical propagation modes in an example multimode optical fiber, e.g., modes for implementing OPMM in the optical communication system of FIG. 1.
Figure 2B:
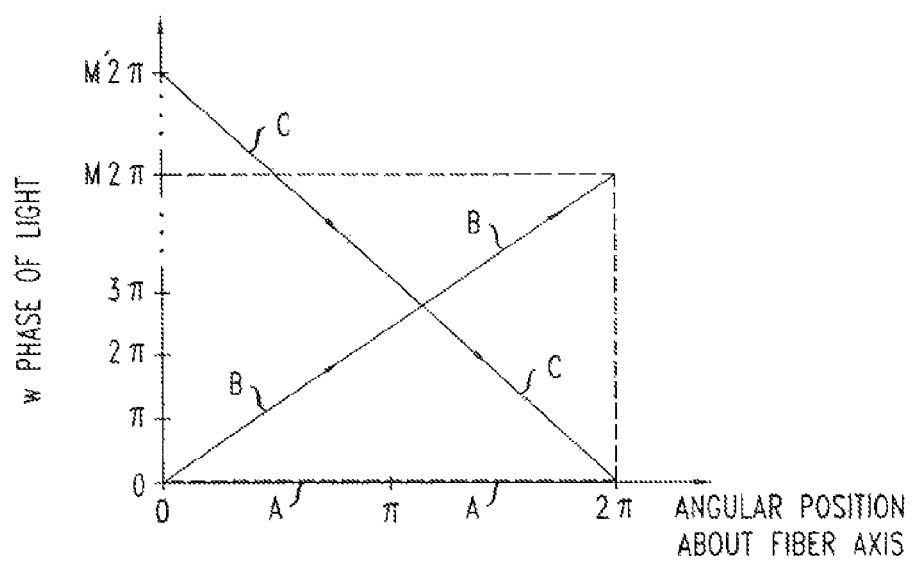
FIG. 2B schematically illustrates angular dependencies of the phase of the optical propagation modes illustrated in FIG. 2A.

The embodiments of the optical communication system 10 use propagating optical modes with different radial light intensity profiles and different angular phase profiles, e.g., as illustrated in FIGS. 2A-2B.

FIG. 2A schematically illustrates radial light intensities of several optical propagation modes A, B, C that may be present in a multimode optical fiber, e.g., the multimode optical transmission fibers of the spans $SP_1$-$SP_N$ in FIG. 1. The mode A has a large light intensity at the center of the multimode optical fiber, e.g., as in a typical fundamental optical propagation mode. The modes B and C have a low or vanishing light intensity at the center of the multimode optical fiber and have one or more high or maximum intensity regions at a radial, distance R from the center of the multimode optical fiber, e.g., as in higher-order propagation modes. For example, the B and C modes may have high intensities in all or part of an annular region about and away from the central axis of the multimode optical fiber.

FIG. 2B schematically illustrates relative phases of high intensity regions of the A-C propagation modes as a function of angle about the central axis of the multimode optical fiber. The A propagation mode has a configuration in which the phase is relatively constant over the various portions of the high intensity region, e.g., near the central axis of the multimode optical fiber. The B propagation mode has a configuration in which the phase increases approximately linearly with the angle about the central axis in the high intensity annular region of the mode. That is, the phase increases by $2\pi M$ over a path circling the axis of the multimode optical fiber in a counterclockwise sense with M being a positive integer, e.g., 1, 2, 3 etc. The C propagation mode has a configuration in which the phase decreases approximately linearly with angle in the high intensity annular region of the mode. That is, the phase decreases by $-2\pi M'$ over a path circling the axis of the multimode optical fiber in a counterclockwise sense with M' being a positive integer, e.g., 1, 2, 3, etc. Herein, M and M' may be the same positive integer or may be different positive integers.

The embodiments will be illustrated with respect to optical propagation modes illustrated in FIGS. 2A-2B. Nevertheless, based on this disclosure, a person of ordinary skill in the art would realize that various embodiments of the optical communication system 10 may be use other optical propagation modes to carry data in the transmission fiber spans $SP_1$-$SP_N$ in FIG. 1, e.g., high-order modes.

Various embodiments of the optical transmitter 12 of FIG. 1 may have a plurality of light sources, wherein each light source generates light whose amplitude and phase profile is individually adapted to more strongly couple to a selected one of the optical propagation modes A, B, and C of the multimode optical transmission fibers of the transmission fiber spans $SP_1$-$SP_N$ in FIG. 1. For that reason, the optical transmitter 12 may be able to simultaneously transmit a different data stream, one each of the optical propagation modes A, B, and C, wherein the different data streams are transmitted with the same or different digital data modulation protocols. In some embodiments, the optical transmitter 12 has more than three light sources, wherein each source is capable of preferentially optically couple to a corresponding different one of the optical propagation modes of the multimode optical transmission fibers of the transmission fiber spans $SP_1$-$SP_N$ of FIG. 1.

Figure 3A:
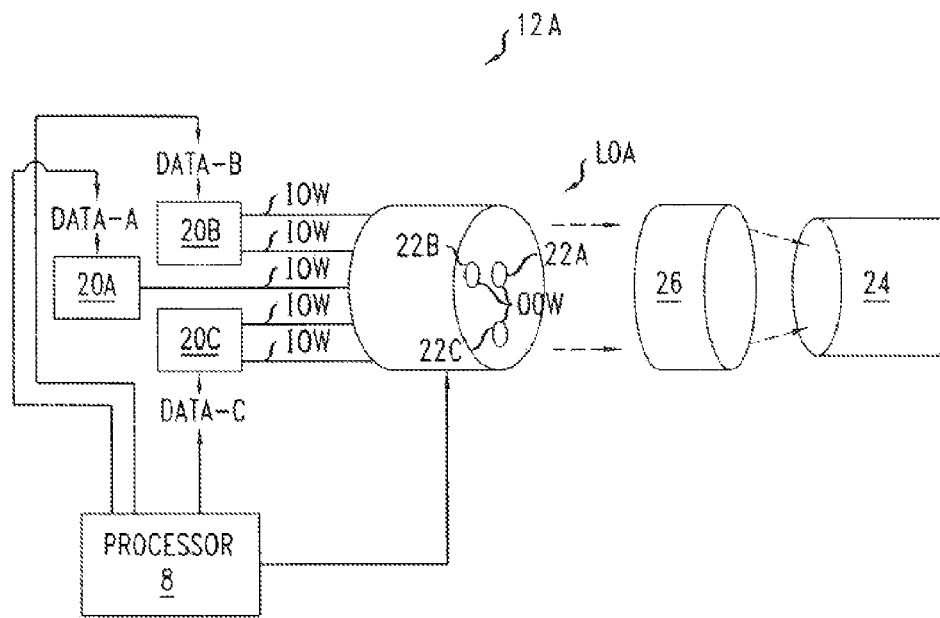
FIG. 3A schematically illustrates an embodiment of an optical transmitter for use in an optical communication system that implements OPMM, e.g., the optical communication system of FIG. 1.

FIG. 3A schematically illustrates one embodiment 12A of the optical transmitter 12 illustrated in FIG. 1. The optical transmitter 12A includes, at least, three optical modulators 20A, 20B, 20C and, at least, three passive light emitters 22A, 22B, 22C.

Each optical modulator 20A, 20B, 20C modulates a corresponding data stream, i.e., DATA-A, DATA-B, or DATA-C onto an optical carrier according to a corresponding amplitude keying and/or phase shift keying modulation protocol. The data streams DATA-A, DATA-B, DATA-C may be, e.g., distinct from each other, and each pair of such data streams may be modulated onto an optical carrier via the same digital data modulation protocols or different digital data modulation protocols. Each optical modulator 20A-20C may be any conventional device for modulating digital, analog, or advanced-modulation format data onto an optical carrier and outputting the modulated optical carrier to an optical output, e.g., to which one or multiple optical waveguides may attach.

Each passive light emitter 22A, 22B, 22C includes an optical waveguide structure that includes one or more input optical waveguides, IOW, to optically connect a corresponding number of the optical modulators 20A-20C to a single output optical waveguide, OOW, of the passive light emitter 22A-22C. In some embodiments, the optical waveguide structure is, e.g., a fiber bundle with one or more input optical fibers, e.g., single-mode optical fibers, and an output optical fiber, e.g., a single-mode optical fiber. In such a fiber bundle, each polarization of each input optical fiber optically couples to a mode of the output optical fiber. In alternate embodiments, the optical waveguide structure may be, e.g., a multicore optical fiber with one or more input optical fiber cores and an output single-mode or multimode optical fiber. In such a multicore optical fiber, each input optical fiber, core optically couples to the output optical fiber. Alternately, the entire set of passive light emitters 22A-22C and/or single passive light emitters thereof may be fabricated as integrated optical device(s).

Each passive light emitter 22A-22C may be fabricated as a fused structure in various manners. In one example, a plurality of optical fibers may be placed in a glass capillary to form a bundle. Then, one end of the bundle is heated to become partially molten, and an output optical fiber, OOW, is produced by drawing the partially molten end of the bundle to produce said fiber. In such an embodiment, the remaining free ends of the original optical fibers form the input optical waveguides, IOW, of the passive light emitter that are optically coupled to the output optical fiber, OOW. In another embodiment, a plurality of optical, fibers are fused together to form the optical waveguide structure of the passive light emitter, i.e., with an output optical fiber, OOW, that, is fixed to and optically coupled to a plurality of input optical fibers, IOW. Indeed, the entire set of passive light emitters 22A-22G of FIG. 3A may be formed by doing such drawing or fusing methods multiple times to produce an optical fiber bundle that fuses together the individual passive light emitters 22A-22C.

For each passive light emitter 22A-22C, the output end of the output optical waveguide, OOW, faces an input end of a multimode optical fiber 24, e.g., the multimode optical transmission fiber of the first transmission fiber span $SP_1$ in FIG. 1.

Thus, the outputs of the passive light emitters 22A-22C form a 2D lateral output array, LOA, optically facing the input end of the multimode optical fiber 24. Due to the lateral output array, LOA, in part, each passive light emitter 22A-22C is configured to preferentially transmit light to a selected one or more optical propagation mode(s) in the multimode optical fiber 24. The set of passive light emitters 22A-22C may couple, e.g., to three or more of the optical propagation modes. The lateral output array, LOA, of the passive light emitters 22A-22C may be fusion spliced to the input end of the multimode optical fiber 24 or may be optically coupled thereto via an optional imaging system 26. The optional imagining system 26 may be a collimating lens or a microlens array or a combination of such a lens system combined with a turning mirror and/or an optical isolator. Alternately, the optional imagining system 26 may be a section of fused optical fibers in which the individual optical fibers adiabatically transform into a multimode optical fiber.

Each optical modulator 20A-20C optically couples differently to the passive light emitters 22A-22C so that the optical transmitter 12A can support OPMM. In particular, the set of passive light emitters 22A, 22B, 22C optionally combined with the imaging system 26 provides an optical coupling matrix between the set of optical modulators 20A, 20B, 20C and the transmission fiber span $SP_1$. The rank of the optical coupling matrix is typically, at least, three so that the set of optical modulators 20A-20C can together simultaneously transmit, at least, three independent data streams via the optical propagation modes of the transmission fiber span $SP_1$.

The optical modulator 20A optically connects to a corresponding input optical waveguide or waveguide Core, IOW, of the passive light emitter 22A. The output end of the output optical waveguide, OOW, of this passive light emitter 22A is located and oriented to preferentially transmit light to a central axial region of the multimode optical fiber 24. This output of the lateral output array, LOA, may be, e.g., directly facing the center portion of the input end of the multimode optical fiber 24. For this reason, the optical modulator 20A optically couples light preferentially into the A optical propagation mode of FIGS. 2A-2B.

The optical modulator 20B optically connects to corresponding input optical waveguides or waveguide cores, IOW, of the remaining two passive light emitters 22B, 22C. The output ends of the output optical waveguides, OOW, of these remaining passive light emitters 22B, 22C are located and oriented to preferentially transmit light to an annular region concentric with and located away from the axial region of the multimode optical fiber 24, i.e., to preferentially transmit light to the high intensity region for the B optical propagation mode of FIGS. 2A-2B. These outputs of the lateral output array, LOA, may, e.g., directly face off-axis regions of the input end of the multimode optical fiber 24. These remaining passive light emitters 22B, 22C may also be connected and configured to deliver light of appropriate nonzero relative phase to the input end of the multimode optical fiber 24 so that the optical modulator 20B preferentially transmits light into the B optical propagation mode of FIGS. 2A-2B therein. For example, the multimode optical fiber 24 may receive light from the first remaining passive light emitter 22B with a relative phase with respect the light received therein from the other remaining passive light emitter 22C, wherein the relative phase is in the interval $[\pi/4, 3\pi/4]$, e.g., a relative phase of about $+\pi/2$.

The optical modulator 20B may optionally also connect to the other passive light emitter 22A, which strongly optically couples to the central region of the multimode optical fiber 24. Such a connection can provide light with an appropriate phase and amplitude to substantially destructively interfere with light received from the remaining passive light emitters 22B and 22C at the central region at the input end the multimode optical waveguide 24. Such an optional configuration can reduce the optical coupling of the optical modulator 20B to the A central optical propagation mode of FIGS. 2A-2B.

The optical modulator 20C also optically connects to corresponding input optical waveguides or waveguide cores, IOW, of the same remaining two passive light emitters 22B, 22C. As already discussed, the output ends of the output optical waveguides of these remaining passive light emitters 22B, 22C are located and oriented to preferentially transmit light to an annular region concentric with and located away from the central axial region of the multimode optical fiber 24. In particular, these outputs of the lateral output array, LOA, also couple light strongly into the off-axis high intensity region for the C optical propagation mode of FIGS. 2A-2B. These remaining passive light emitters 22B, 22C may also be connected and configured to deliver light from the optical modulator 20C into the input end of the multimode optical fiber 24 with an appropriate nonzero relative phase so that the optical modulator 20C preferentially couples said light into the C optical propagation mode of FIGS. 2A-2B therein. For example, the multimode optical fiber 24 receive such light from the first remaining passive light emitter 22B with a relative phase with respect such light received therein from the second remaining passive light emitter 22C, wherein the relative phase is in the interval $[-\pi/4, -3\pi/4]$, e.g., a relative phase of about $-\pi/2$.

The optical modulator 20C may also optionally connect to the passive light emitter 22A, which strongly couples to the central region of the input end of the multimode optical fiber 24. This connection may be configured to provide such light with a phase and amplitude appropriate to destructively interfere with light that the remaining two passive light emitters 22B, 22C transmit from the optical modulator 20C to the central region of the input end the multimode optical fiber 24. Such an optional connection can reduce the optical coupling of the optical modulator 20C to the central A optical propagation mode of FIGS. 2A-2B.

Figure 3B:
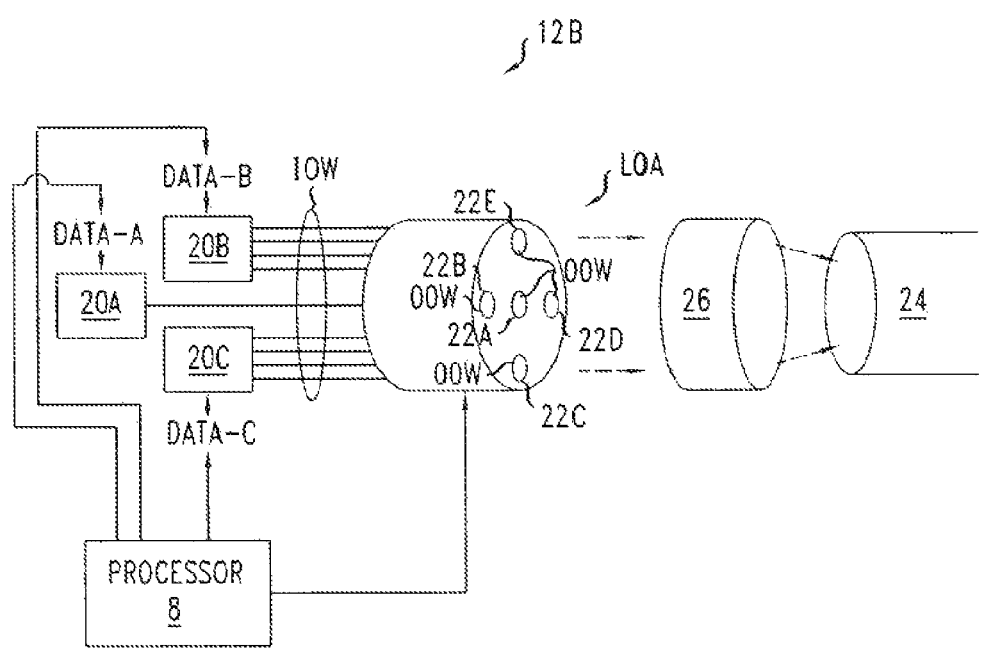
FIG. 3B schematically illustrates another embodiment of an optical transmitter for use in an optical communication system that implements OPMM, e.g., the optical communication system of FIG. 1.

FIG. 3B schematically illustrates another embodiment 12B of the optical transmitter 12 of FIG. 3A. The optical transmitter 12B includes three optical modulators 20A, 20B, 20C and a set of four passive light emitters 22A, 22B, 22C, 22D, 22E.

Each optical modulator 20A, 20B, 20C may modulate a corresponding data stream, i.e., DATA-A, DATA-B, or DATA-C, onto an optical carrier according to a corresponding amplitude keying and/or a phase shift keying modulation protocol. The data streams DATA-A, DATA-B, DATA-C may be, e.g., distinct from each other, and each pair of such data streams may be, e.g., modulated onto the optical carrier via the same digital data modulation protocol or a different digital data modulation protocol. Each optical modulator 20A-20C may be any conventional device for modulating digital data onto an optical carrier and outputting the modulated optical carrier, e.g., to one or multiple optical waveguides.

Each passive light emitter 22A-22E includes an optical waveguide structure that includes one or more input optical waveguide(s), IOW, to optically connect a corresponding one or more of the optical modulators 20A-20C to a single output optical waveguide, OOW, of the passive light emitter 22A-22E. The passive light emitters 22A-22E may have the types of structures already described for the passive light emitters of FIG. 3A.

Each passive light emitter 22A-22E has an output optical waveguide whose output end optically faces an input end of a multimode optical fiber 24, e.g., the multimode optical transmission fiber of the first span $SP_1$ in FIG. 1. That is, the outputs of the passive light emitters 22A-22E form a 2D lateral output array, LOA, optically facing the input end of the multimode optical fiber 24. In part, due to the lateral output array, LOA, each passive light emitter 22A 22E preferentially transmits light to one or more of the optical propagation modes in the multimode optical fiber 24. The set of passive light emitters 22A-22E may couple e.g., to three or more of the optical propagation modes so that three or more different modulated carriers may be simultaneously carried by the set formed by these optical propagation modes. The passive light emitters 22A-22E may be fusion spliced to the input end of the multimode optical fiber 24 or may be optically coupled thereto via an optional imagining system 26, e.g., a collimating lens or a micro-lens array or such a lens system combined with a turning mirror and/or an optical isolator.

In FIG. 3B, each optical modulator 20A, 20B, 20C optically connects differently to the passive light emitters 22A-22E to provide for OPMM.

The optical modulator 20A optically connects to the passive light emitter 22A, which has a waveguide end located and oriented to strongly transmit light to a central region of input end of the multimode optical fiber 24. For that reason, the optical modulator 20A transmits light preferentially to the central A optical propagation mode of FIGS. 2A-2B.

The optical modulators 20B and 20C optically connect to the remaining four passive light emitters 22B-22E, which have outputs located and oriented to preferentially transmit light to an annular region concentric with and located away from the axis of the multimode optical fiber 24. These outputs preferentially transmit light to the high intensity region for the B and C optical propagation modes of FIGS. 2A-2B.

The different passive light emitters 22B-22E deliver light having zero or nonzero relative phases to the input end of the multimode optical fiber 24. The optical modulator 20B (20C) is connected so that the phase of light delivered from the outputs of the 2D lateral output array, LOA, of the passive light emitters 22B-22E increases (decreases) in a counter-clockwise (clockwise) sense. For example, the sequential increase (decrease) in the relative phase for the passive light emitters 22B-22E between sequentially adjacent output ends may in the interval $[\pi/4, 3\pi/4]$ ($[-\pi/4, -3\pi/4]$), e.g., a sequential increase (decrease) of about $\pi/2$ ($-\pi/2$). For these reasons, the optical modulators 20B and 20C preferentially couple to the respective B and C optical propagation modes of the multimode optical fiber 24.

The optical modulators 20B and 20C may optionally be connected to transmit light to the passive light emitter 22A such that the light has a phase and amplitude suitable to destructively interfere with light received from the passive light emitters 22B-22E at the center region of the input end of the multimode optical waveguide 24. Such destructive interference can reduce the coupling of the optical modulators 20B and 20C to the A optical propagation mode of FIGS. 2A-2B.

FIG. 3C schematically illustrates an embodiment 12G of the optical transmitter 12 of FIG. 3A that also implements polarization mode multiplexing along with OPMM. The optical transmitter 12C is constructed as in FIG. 3A or 3B except that this embodiment has both first optical modulators 20A, 20B, 20C and first passive light emitters 22A, 22B, 22C connected thereto and second optical modulators 20A', 20B', 20C' and second passive light emitters 22A', 22B', 22C' connected thereto.

The sets of first and second passive light emitters 22A-22C and 22A'-22C' transmit orthogonal linear polarizations to the two input ports of a polarization combiner 28. For that reason, the 2D lateral output arrays, LOA, corresponding to the set of the first passive light emitters 22A-22C and the set of the second passive light emitters 22A'-22C' respectively, transmit light with orthogonal linear polarizations to the multimode optical fiber 24. To produce suitable polarizations, the optical transmitter 12C may include polarization rotator(s) between the polarization combiner 30 and one or both of the sets of passive light emitters 22A-22C, 22A'-22C', and/or the optical waveguides of the passive light emitters 22A-22C, 22A'-22C' may be polarization maintaining optical waveguides. The associated local output arrays, LOA, "optically" face the input end of the multimode optical fiber 24, because these arrays effectively face the input end of the multimode optical fiber 24 via the action of the polarization combiner 28. The polarization combiner 28 may be a birefringent crystal device or another conventional polarization combiner.

The optical transmitter 12C can implement both polarization multiplexing and OPMM. In particular, the optical transmitter 12C may transmit independent digital data streams DATA-A, DATA-B, and DATA-C to respective first, second, and third optical propagation modes with a first linear polarization and simultaneously transmit separately independent digital data stream DATA-A', DATA-B', and DATA-C' to respective first, second, and third optical propagation modes with an orthogonal linear polarization.

In some alternate embodiments, the second set of passive optical emitters 22A'-22C' and the corresponding optical modulators 20A'-20C' are absent from the optical transmitter 12C. Then, the polarization combiner 28 functions to configure the polarization of the light from the first set of passive light emitters 22A-22C.

Figure 3D:
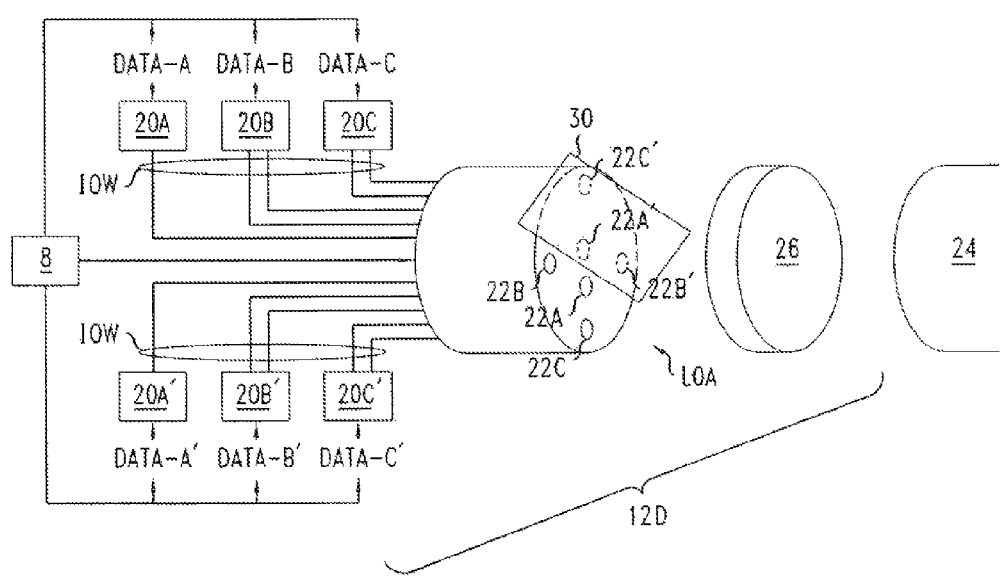
FIG. 3D schematically illustrates another embodiment of an optical transmitter that also implements OPMM and polarization mode multiplexing, e.g., for use in the optical communication system of FIG. 1.

FIG. 3D schematically illustrates a third embodiment 12D of the optical transmitter 12 of FIG. 1 that implements polarization multiplexing and OPMM of modulated optical carriers that are linearly polarized. The optical transmitter is constructed as in FIG. 3C except that the passive light emitters 22A, 22B, 22C and the passive light emitters 22A', 22B', 22C' produce a single 2D lateral output array, LOA, and the passive light emitters 22A-22C, 22A'-22C' deliver light with the same linear polarization to the linear output array, LOA. For example, the two sets of passive light emitters 22A-22C and 22A'-22C' may be a single fiber bundle or a single multicore optical fiber, in which the polarization of received light is maintained. The first optical modulators 20A, 20B, 20C connect to the first three passive light emitters 22A, 22B, 22C, and the second optical modulators 20A', 20B', 20C' connect to the remaining three passive light emitters 22A', 22B', 22C'. In some such embodiments, the passive light emitters 22A-22C and 22A'-22C' emit light in the same linear polarization state at the local output array, LOA. In such embodiments, the optical transmitter 12D also includes an optical element 30 that produces a relative polarization rotation of about 90 degrees between the light output from the first passive light emitters 22A, 22B, 22C and the light output from the remaining passive light emitters 22A', 22B', 22C'. To produce such a polarization rotation, the optical element 30 may be a birefringent ½ wave plate or an equivalent polarization rotator that is positioned to receive light only from the set of the second passive light emitters 22A', 22B', 22C' and to rotate the polarization of said light. The optical transmitter 12D implements both polarization multiplexing and OPMM thereby enabling the simultaneous transmission of six separate digital data streams, i.e., DATA-A, DATA-B, DATA-C, DATA-A', DATA-B', and DATA-C'.

Figure 3E:
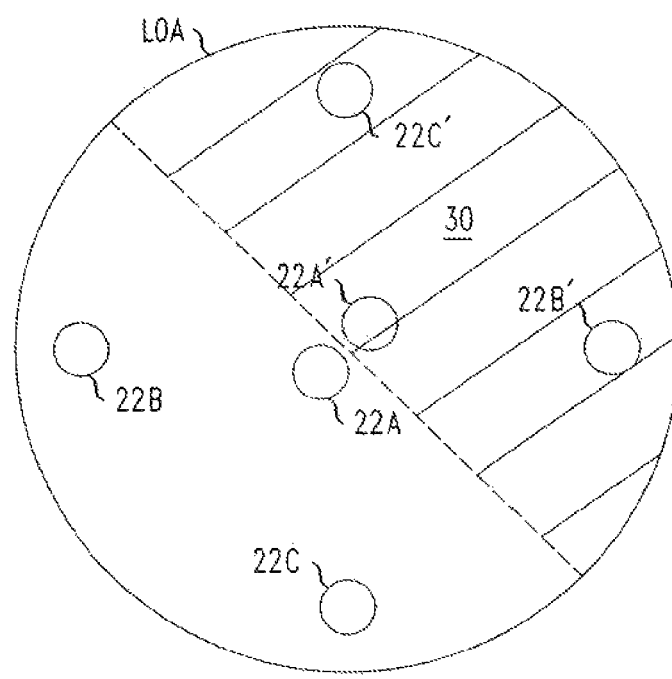
FIG. 3E is an end view illustrating one example of a 2D lateral output array (LOA) of passive light emitters, e.g., for use in the optical transmitter of FIG. 3D.

FIG. 3E is a face view one example of a local output array, LOA, for the passive light emitters 22A, 22B, 22C, 22A', 22B', 22C' of the optical transmitter 12D of FIG. 3D. In the example local output array, LOA, the outputs of the passive light emitters 22A and 22A' are centrally located in the array, i.e., to better couple to the central A optical propagation mode of FIGS. 2A-2B at the multimode optical fiber 24. In the example local output array, LOA, the outputs of the passive light emitters 22C, 22C, 22B', and 22C' are located in an annular region around and away from the array's center, i.e., to better couple to the B and C optical propagation modes of FIGS. 2A-2B at the multimode optical fiber 24. The lateral physical separation of outputs of the two sets of passive light emitters, i.e., 22A, 22B, 22C and 22A', 22B', 22C', in the local output array, LOA, enables positioning the optical element 30 to polarization rotate the light from the outputs of only the second set of passive light emitters 22A'-22C'. In other embodiments, said relative rotation may be performed by in the set of the first passive light emitters, i.e., 22A-22C, itself e.g., by suitably optical fibers therein about their optical axes.

Figure 3F:
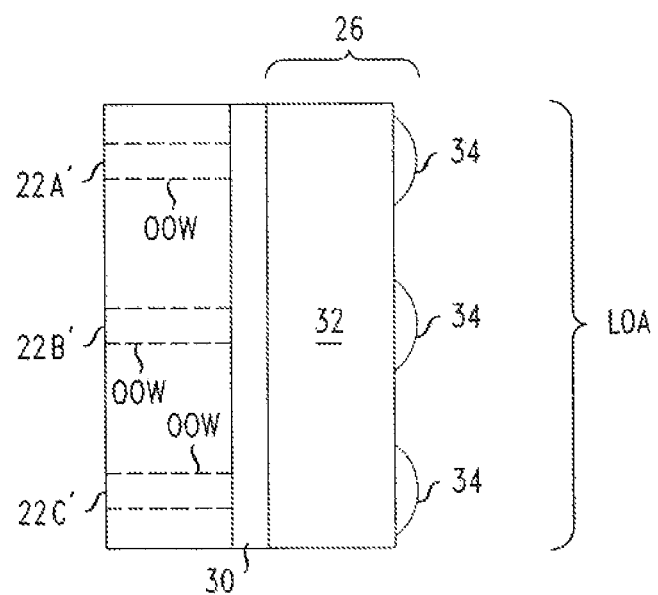
FIG. 3F is a top sectional view illustrating a planar embodiment of a set of passive light emitters, e.g., for use in the optical transmitter of FIG. 3C.

FIG. 3F is a top view of an end portion of a planar device embodying the passive light emitters 22A'-22C' in one embodiment of the optical transmitter 12C of FIG. 3C. In this embodiment, the optical element 30 is a birefringent ½ wave layer that intercepts light only from the passive light emitters 22A-22C, and the optional imagining system 26 includes an optical spacer layer 32 and an array of collimating micro-lenses 34. The micro-lenses 34 are positioned to substantially collimate or focus the output light from the passive light emitters 22A-22C and 22A'-22C'. For that reason, the emitted light beams can be substantially size-matched to various optical propagation modes in the multimode optical fiber 24 thereby improving the optical coupling to the multimode optical fiber 24.

A second planar device (not shown) may embody the first set of passive light emitters 22A-22C of FIGS. 3A-3D. The second planar device may have the same construction of the planar device of FIG. 3F except that the birefringent ½ wave layer 30 is absent. The first and second planar devices may be located in a single integrated optical structure or in separate integrated optical structures.

Various embodiments of the optical transmitters 12A-12D of FIGS. 3A-3D may also include a processor 8. The processor 8 may preprocess data prior to sending the data to die various optical modulators, e.g., the optical modulators 20A-20C and/or optical modulators 20A'-20C'. The preprocessing may, e.g., precompensate for mixing of independent data streams into different ones of the optical propagation modes in the optical channel and/or the mixing of the detection of said optical propagation modes in the light detectors of the receiver 14. Through such precompensation, the optical receiver 14 can be connected to receive modulated optical carriers in which the mixing of different transmitted digital data streams is substantially absent. The processor 8 may also electrically control segment(s) of the one or more input waveguides, OOW, of the passive light emitters 20A-20E, 20A'-20C' to enable dynamic control of relative phase of light delivered to the local output arrays, LOA, from the various optical modulators 20A-20C. Each segment may, e.g., have an electro-optically or thermally active waveguide core whose refractive index is controllable by a voltage applied by the processor 8 across electrodes adjacent to the segment.

Figure 4A:
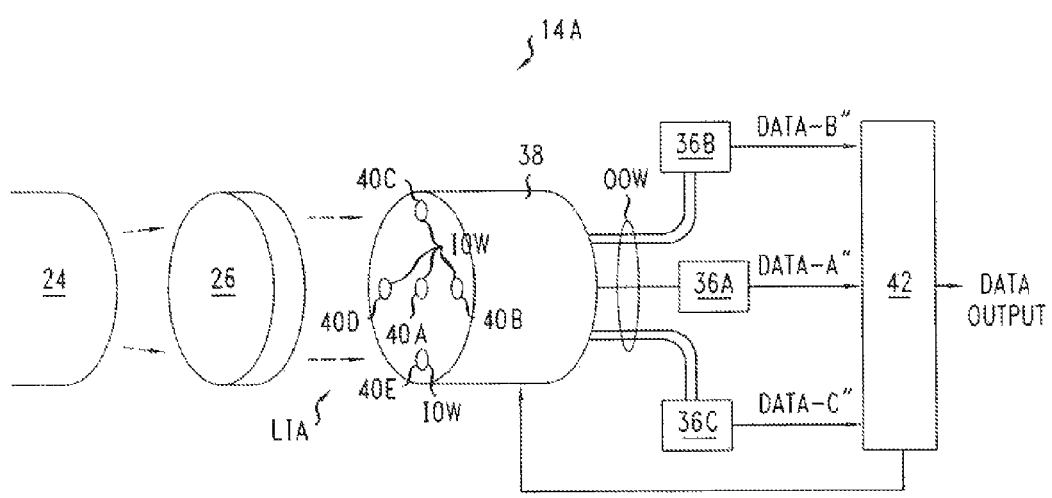
FIG. 4A schematically illustrates an embodiment of an optical receiver that demodulates data from an optical carrier dial was modulated according to OPMM, e.g., for use in the optical communication system of FIG. 1.

FIG. 4A schematically illustrates one embodiment 14A of the optical receiver 14 illustrated in FIG. 1. The optical receiver 14A includes a set of three optical data demodulators 36A, 36B, 36C, a set 38 of passive optical receivers 40A, 40B, 40C, 40D, 40E, and an optional electronic processor 42. Each optical data demodulator 36A-36C optically demodulates a digital data stream, i.e., DATA-A", DATA-B", or DATA-C" from a received modulated optical carrier. Each passive optical receiver 40A-40E preferentially couples light from one or more of the optical propagating modes of the multimode optical fiber 24, e.g., the A-C modes of FIGS. 2A-2B, into one or more of the optical data demodulators 36A, 36B, 36C. The optional processor 42 may further process the demodulated digital data streams from the optical digital data demodulators 36A-36C, e.g., to remove undesired mixing of separate data streams and/or to remove undesired signal distortions, e.g., produced in the physical optical channel.

When the optical carrier has been modulated according to an OPMM scheme, the set of passive optical receivers 40A-40E effectively function as a 3×3 optical coupler so that each data demodulator 36A, 36B, 36C can receive and demodulate data carried by one or more of the optical propagation modes of the multimode optical fiber 24. Between the three digital data-carrying optical propagation modes of the multimode optical fiber 24 and the three optical data demodulators 36A-36C, the set of passive optical receivers 40A-40E functions effectively as an optical coupling matrix of rank three or more, e.g., an optical coupling matrix that is substantially diagonal. Each optical data demodulator 36A-36C may have any conventional form for optically demodulating digital data from an optical carrier that has been amplitude and/or phase modulated.

Each passive optical receiver 40A-40E may be formed in a manner similar to a directionally-reversed form of any of the passive light emitters 22A-22E illustrated in FIGS. 3A-3E. In particular, each passive optical receiver 40A-40E is an optical waveguide structure with a single input optical waveguide, IOW, and one or more output optical waveguides, OOW, that optically connects a corresponding one of the optical demodulators 36A-36C to the input optical waveguide, IOW. In some embodiments, the optical waveguide structure is, e.g., an optical fiber bundle with a single input optical fiber, IOW, e.g., a single-mode optical fiber, and one or more output optical fibers, OOW, e.g., single-mode optical fibers. In such a fiber bundle, each output optical fiber, OOW, optically connects a corresponding one of the optical demodulators 36A-36C to the input optical fiber, IOW. In other embodiments, the optical waveguide structure is, e.g., a multicore optical fiber with a single input optical fiber, IOW, and one or more output optical fiber cores, OOW. Each output optical fiber core, OOW, optically connects a corresponding one of the optical demodulators 36A-36C to the single input optical fiber, IOW, of the multicore optical fiber.

Each passive optical receiver emitter 40A-40E may be fabricated as a fused structure in various manners. In one example, a plurality of optical fibers may be placed in a glass capillary to form a bundle. Then, one end of the bundle is heated to become partially molten, and an input optical fiber, IOW, is produced by drawing a fiber from the partially molten end of the bundle. In such an embodiment, the free ends of the original optical fibers form the output optical waveguides, OOW, of the passive optical receiver that are coupled to the input optical fiber, IOW. In another embodiment, a plurality of optical fibers are fused together to form the optical waveguide structure of the passive optical receiver, i.e., with one input optical fiber, IOW, fixed and optically coupled to one or more output optical fibers, OOW. Indeed, the entire set of passive optical receivers 40A-40E of FIG. 4A may be formed by performing one or multiple steps of such drawing or fusing methods for making an optical fiber bundle thereby fusing together the individual passive optical receivers 40A-40E.

For each passive optical receiver 40A-40E, the input end of the input optical waveguide, IOW, optically faces an output end of a multimode optical fiber 24, e.g., the multimode optical transmission fiber of the last span $SP_N$ in FIG. 1. Thus, the outputs of the passive optical receivers 40A-40E form a 2D lateral input array, LIA, optically facing the output end of the multimode optical fiber 24. In the lateral input array, LIA, each passive optical receiver 40A-40E is typically configured and/or located to preferentially receive light from a selected one or more of the optical propagation modes in the multimode optical fiber 24. The outputs of the passive optical receivers 40A-40E may be combined, e.g., at the optical data demodulators 36A-36C, to preferentially transmit light of the A, B, and C optical propagation modes of FIGS. 2A-2B, to die optical data demodulators 36A, 36b, and 36C, respectively. The lateral input array, LIA, may be fusion spliced to the output end of die multimode optical fiber 24 or may be optically coupled to that output end via an optional imagining system 26, e.g., a collimating lens or a micro-lens array or such a lens system combined with a turning mirror and/or optical isolator.

Each optical data demodulator 36A-36C optically connects differently to the set of passive optical receivers 40A-40E to provide for OPMM.

The optical data demodulator 36A optically connects to a corresponding output optical waveguide, OOW, of the passive optical receiver 40A. The input end of the input optical waveguide, IOW, of this passive optical receiver 40A is located and oriented to preferentially receive light from the central region of the multimode optical fiber 24. For that reason, this passive optical receiver 40A may preferentially receive light from the central A optical propagation mode of FIGS. 2A-2B. This input of the lateral input array, LIA, may be, e.g., directly facing the central portion of the output end of the multimode optical fiber 24. For that reason, the optical data demodulator 36A may be strongly coupled to the A optical propagation mode of FIGS. 2A-2B.

Each optical data demodulator 36B-36C optically connects to a corresponding output optical waveguide, OOW, of some or all of the remaining passive optical receivers 40B-40E. The inputs of the input optical waveguides, IOW, of these passive optical receivers 40B-40E are located on the lateral input array, LIA, in a manner to preferentially receive light from an annular region of output end of the multimode optical fiber 24. The annular region may be, e.g., a high intensity region for the B and C optical propagation modes B of FIGS. 2A-2B. Since the B and C optical propagation modes transmit light to the various passive optical receivers 40B-40E with nonzero relative phases, the light received thereat may also be delayed with a set of nonzero relative phases prior to recombination at the optical data demodulator 36B and may be delayed with a different set of nonzero relative phases prior to recombination at the optical data demodulator 36C. The relative phases may be selected so that the optical data demodulator 36B preferentially receives light from the B optical propagation mode and so that the optical data demodulator 36C preferentially receives light from the C optical propagation mode. At the optical data demodulator 36C, the added phase relative to light from one passive optical receiver 40B-40E may be in the interval $[\pi/4, 3\pi/4]$, e.g., about $\pi/2$, for light from the passive optical receiver 40B-40E with a clockwise adjacent input end on the lateral input array, LIA. At the optical data demodulator 36B, the added phase relative to light from one passive optical receiver 40B-40E may be in the interval $[-\pi/4, -3\pi/4]$, e.g., about $-\pi/2$, for light from the passive optical receiver 40B-40E with clockwise adjacent input end on the lateral input array, LIA. Typically, the relative phases introduced by the passive optical receivers 40B-40E are substantially optimized so that light transmitted via the B and C optical propagation modes constructively interferes at the optical data demodulators 36A and 36B, respectively.

In some embodiments, the optical data demodulators 36A-36C include coherent optical detectors that mix light received, from the multimode optical fiber 24 with light received from a local optical oscillator. For example, such mixing may be performed in one or more optical hybrids that use matched pairs of photodiodes as optical detectors of said mixed light. Some structures that may be suitable for such coherent detectors may be described in U.S. patent application Ser. No. 11/204,607, which was filed Aug. 15, 2005; U.S. patent application Ser. No. 11/236,246, which was filed Sep. 27, 2005; and/or U.S. patent application Ser. No. 11/644,536, which was filed Dec. 22, 2006. The above three U.S. patent applications are incorporated herein by reference in their entirety.

In some such embodiments, the local oscillator may be connected to transmit local oscillator light directly to the optical data modulators 36A-36C. That is, the light is transmitted directly from the local oscillator to the optical data modulators 36A-36C in a manner that bypasses the passive optical receivers 40A-40E.

In alternate such embodiments, the local oscillator may transmit light to the inputs of the lateral input array, LIA, so that the passive optical receivers 40A-40E carry light that is received from the local oscillator and the multimode optical fiber 24. In these embodiments, the local oscillator transmits light to the lateral input array, LIA, with phase and amplitude profiles that overlap with those of light transmitted thereto by the A, B, and C propagating modes of the multimode optical fiber 24. Then, the individual passive optical receivers 40A-40E cause the same relative phase shifts to light from the local oscillator and light, from the multimode optical fiber 24. For that reason, the light from different ones of the passive optical receivers 40A-40E can still add in a manner that supports coherent optical detection when combined at the optical data modulators 36A-36C.

In alternate embodiments (not shown), the optical receiver 14A of FIG. 4A may only have the passive optical receivers 40A-40C. That is, in such alternate embodiments, the passive optical receivers 40D-40E are absent.

In other such alternate embodiments, the inputs of the passive optical receivers 40B-40C or 40B-40E may be located at relative different angular positions with respect to the position of the input of the passive optical receivers 40A in the lateral input array, LIA. In such embodiments, the passive optical receivers 40B-40C of 40B-40E may cause a different relative phases to light carried therein so that the optical data demodulators 36B and 36C can still use combine said light to detect data modulated onto the respective B and C optical propagation modes.

Figure 4B:
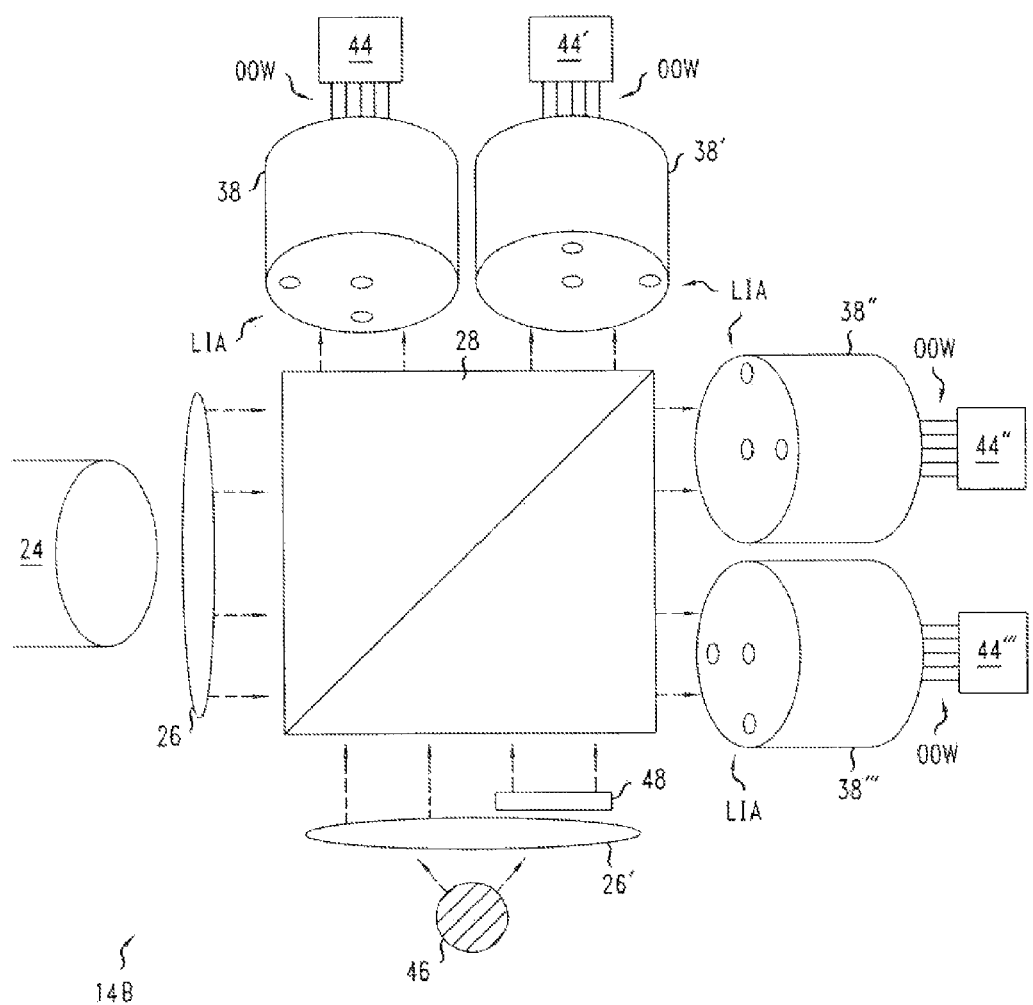
FIG. 4B schematically illustrates another embodiment of an optical receiver that demodulates data that was modulated according to OPMM, polarization, multiplexing, and a quadrature phase shift keying, e.g., for use in the optical communication system of FIG. 1.

FIG. 4B schematically illustrates another embodiment 14B of the optical receiver 14 of FIG. 1. The optical receiver 14B is configured to demodulate data streams from received optical signals that are optical propagation mode multiplexed, polarization multiplexed, and modulated according to a quadrature phase shift keying protocol. The optical receiver 14B includes first, second, third, and fourth sets 38, 38', 38", 38''' of passive optical receivers; corresponding first, second, third, and fourth sets 44, 44', 44", 44''' of passive optical receivers; a polarization beam splitter 28; an optical local oscillator 46; an optical phase plate 48; and two optional collimating optical systems 26, 26'.

Each set 38-38''' includes three or more passive optical receivers, e.g., four, five, six or more passive optical receivers constructed and/or configured as described with respect to FIG. 4A. Each set 38-38''' of passive optical receivers receives data modulated light from the multimode optical fiber 24 and receives reference light from the local optical source 46.

Each set 44-44''' includes three optical data demodulators constructed and configured as coherent optical detectors as already described, e.g., using structures described in the above-incorporated U.S. patent applications. In each set 44-44''', the first, second, and third optical data demodulators are configured to preferentially receive light from the respective A, B, and C optical propagation modes of the multimode optical fiber 24.

The phase plate 48 introduces about a ¼ period of relative phase delay between the reference light sent to the linear input arrays, LIA, of the first set 38 and the second set 38' and introduces about a ¼ period of relative phase delay between the reference light sent to the linear input arrays, LIA, of the third set 38'' and the fourth set 38'''. For that reason, the first and third sets 44, 44'' of optical data demodulators can demodulate data carried on in-phase components of the received light, and the second and fourth sets 44', 44''' of optical data demodulators can demodulate data carried on quadrature-phase components of the received light.

The polarization beam splitter 28 is configured to direct one polarization of the light from the multimode optical fiber 24 and the optical local oscillator 44 to the first and second sets 38, 38' of passive optical receivers and is configured to direct the relatively orthogonal polarization components of said light to the third and fourth sets 38'', 33''' of passive optical receivers. For these reasons, the first and second sets 44, 44' of optical data demodulators demodulate a data stream carried by one polarization component, and the third and fourth sets 44'', 44''' of optical data demodulators demodulate a data stream carried by the relatively orthogonal polarization component.

Finally, each set 38-38''' of passive optical receivers forms a 2D lateral input array with one input optically facing the center of the multimode optical waveguide 24 and two or more peripheral inputs optically facing off-center regions of the multimode optical waveguide 24. For that reason, one passive optical receiver of each set 38-38''' preferentially receives light from the central A optical propagation mode of the multimode optical fiber 24, and the remaining passive optical receivers of each set 38-38''' preferentially receive light from the B and C optical propagation modes of the multimode optical fiber 24. In each set 38-38''', the passive optical receivers cause suitable relative delays between light carried therein so that the combinations of light delivered to the optical demodulators of each set 44-44''' enable the first, second, and third optical demodulators thereof to demodulate data carried by the respective A, B, and C optical propagation modes of FIGS. 2A-2B.

Figure 4C:
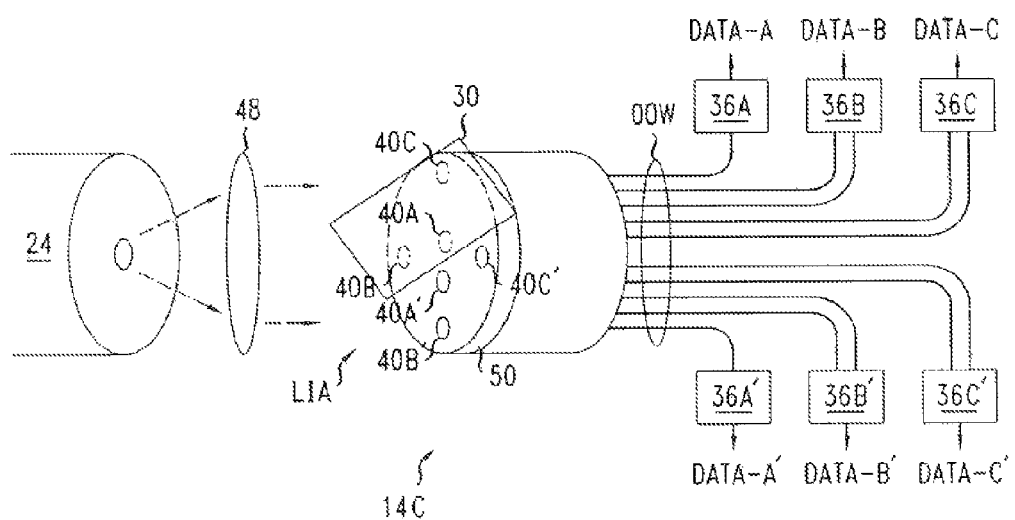
FIG. 4C schematically illustrates another embodiment of an optical receiver that demodulates data that was modulated according to OPPM and polarization multiplexing, e.g., for use in the optical communication system of FIG. 1.

FIG. 4C schematically illustrates another embodiment 14C of the optical receiver 14 of FIG. 1 that is configured to demodulate data modulated via optical propagation mode multiplexing with polarization mode multiplexing. The optical receiver 14C has a construction that is similar to the optical receivers 14A, 14B of FIGS. 4A and 4B. But, the optical receiver 14C includes a first set of optical data demodulators 36A, 36B, 36C and a corresponding first set of passive optical receivers 40A, 40B, 40C and has a second set of optical data demodulators 36A', 36B', 36C', and a corresponding second set of passive optical receivers 40A', 40B', 40C'. The optical data demodulators 36A-36C of the first set optically connect to the passive optical receivers 40A-40C of the first set, and the optical data demodulators 36A'-36C' of the second set optically connect to the passive optical receivers 40A'-40C' of the second set.

Also, the optical receiver 14C includes a birefringent optical ½ wave plate 30 and a linear polarizer 50. Both the optical ½ wave plate 30 and the linear polarizer 50 are located between the output end of the multimode optical fiber 24 and the optically facing 2D lateral input array, ILA, formed by the inputs of the passive optical receivers 40A-40C, 40A'-40C'. The ½ wave plate 30 is located between the inputs of the passive optical receivers 40A-40C and the output of the multimode optical fiber 24, but is not located between the inputs of the passive optical receivers 40A'-40C and the output of the multimode optical fiber 24. For this reason, the first set of optical data demodulators 36A, 36B, and 36C and the second set of optical demodulators 36A', 36B', and 36C' demodulate the respective data streams DATA-A, DATA-B, DATA-C and DATA-A', DATA-B', DATA-C' from the respective A, B, and C optical propagation modes of relatively orthogonal polarization.

In some embodiments, the passive optical receivers 40A-40C and 40A'-40C' have structures as described with respect to FIG. 4A or 4B or have structures that are direction-reversed versions of the structures of the passive optical emitters 22A-22C and 22A'-22C' illustrated in FIGS. 3E and/or 3F.

Figure 5:
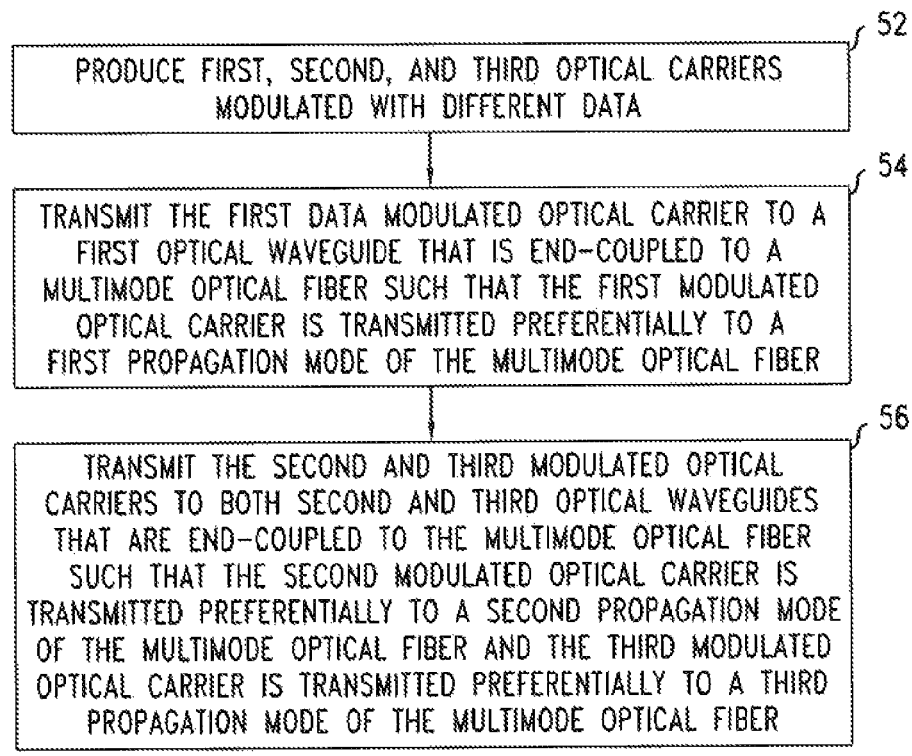
FIG. 5 is a flow chart illustrating a method Of optical transmitting a digital data stream, e.g., for use in the optical transmitters of FIGS. 3A-3D.

FIG. 5 illustrates a method 50 of optically transmitting digital data, e.g., with any of the optical transmitters of FIGS. 3A-3D. The method 50 includes producing first, second, and third optical carriers modulated with different digital data (step 52). The method 50 includes transmitting the first data modulated optical carrier to a first optical waveguide that is end-coupled to a multimode optical fiber such that the first modulated optical carrier is transmitted preferentially to a first propagation mode of the multimode optical fiber (step 54). The method includes transmitting the second and third modulated optical carriers to both second and third optical waveguides that are end-coupled to the multimode optical fiber such that the second modulated optical carrier is transmitted preferentially to a second propagation mode of the multimode optical fiber and the third modulated optical carrier is transmitted preferentially to a third propagation mode of the multimode optical fiber (step 56). The first, second and third optical propagation modes are orthogonal propagation modes in the multimode optical fiber.

In some embodiments of the method 50, the transmitting steps 54 and 56 may be temporally performed in parallel to produce optical propagation mode multiplexing.

In some embodiments of the method 50, the second propagation mode has a phase that increases along a circle about the axis of the multimode optical fiber in one direction, and the third propagation mode has a phase that increases along the circle in an opposite direction.

Figure 6:
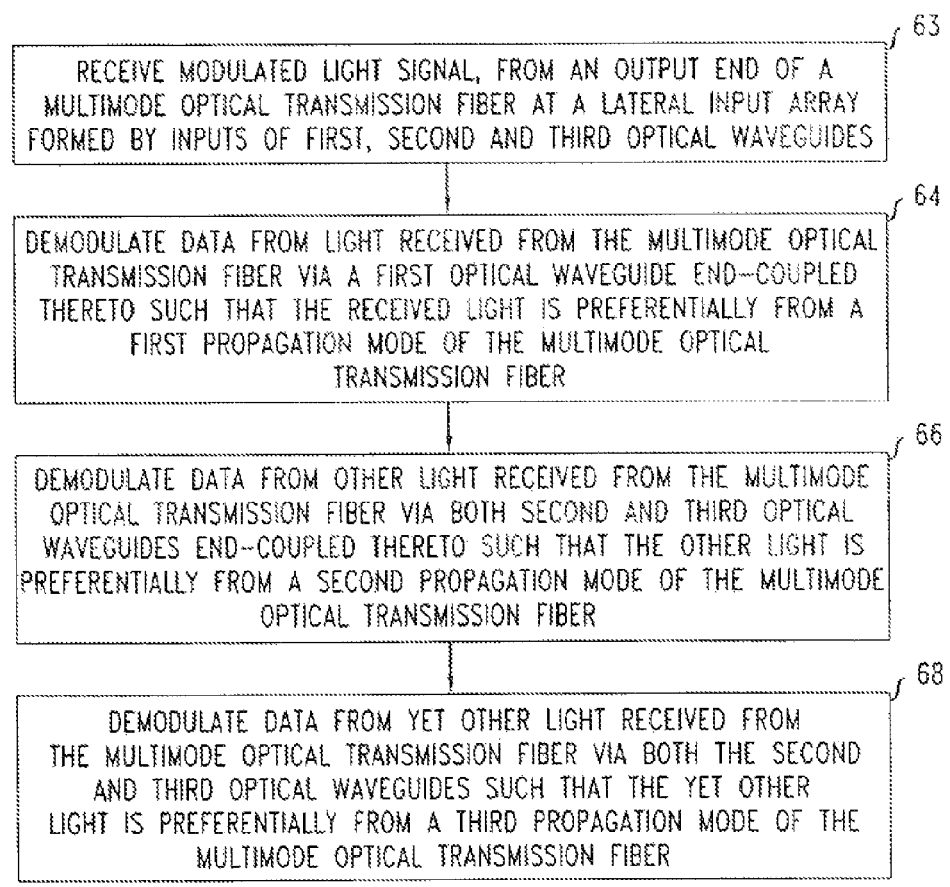
FIG. 6 is a flow chart illustrating a method of optically receiving a digital data stream, e.g., for use in the optical receivers of FIGS. 4A-4C.

FIG. 6 illustrates a method 60 of optically receiving digital data, e.g., using any of the optical receivers of FIGS. 4A-4C. The method 60 may include receiving a modulated light signal from an output end of a multimode optical transmission fiber at a lateral input array, LIA, formed by inputs of first, second and third optical waveguides (step 62). The method 60 includes demodulating data from light received from the multimode optical waveguide via a first optical waveguide end-coupled thereto such that the received light is preferentially from a first propagation mode of the multimode optical waveguide (step 64). The method 60 includes demodulating data from other light received from the multimode optical waveguide via both second and third optical waveguides end-coupled thereto such that the other light is preferentially from a second propagation mode of the multimode optical waveguide (step 64). The method to includes demodulating data from yet other light received from the multimode optical waveguide via both the second and third optical waveguides such that the yet other light is preferentially from a third propagation mode of the multimode optical waveguide (step 66). The first, second and third propagation modes are orthogonal propagation modes in the multimode optical fiber.

In some embodiments of the method 60, the demodulating steps 62, 64, and 66 may be temporally performed, in parallel, to produce optical propagation mode multiplexing.

In some embodiments of the method 60, the second propagation mode has a phase that increases as a circle about the axis of the multimode optical fiber is traversed in one direction, and the third propagation mode has a phase that increases as the circle is traversed in an opposite direction.

In alternate embodiments of optical communication systems to the systems illustrated in FIGS. 3A-3D and/or 4A-4C, more and/or different optical propagation modes of the multimode optical transmission fibers may carry data. For example, these embodiments may use 4, 5, 6, or more such optical propagation modes to enable the simultaneous transmission of more than three independent data streams and/or may use different and/or higher order modes. In such alternate embodiments lateral placements of outputs of the set(s) of passive light emitters in the LOA and/or of inputs of the set(s) of passive optical, receivers in the LIA may be different to better optically couple to the high light intensity regions of the optical propagation modes selected for carrying data.

From the disclosure, drawings, and claims, other embodiments of the invention will be apparent to those skilled in the art.

What is claimed is:

1. An apparatus comprising:
an optical transmitter comprising a set of optical waveguides and first, second, and third optical modulators; and
wherein output ends of the optical waveguides of the set form a lateral output array for end-coupling the optical waveguides of the set to a multimode optical fiber in response to the array being located to optically face one end of the multimode optical fiber; and
wherein the first optical modulator is optically connected to a first of the optical waveguides of the set and each of the second and third optical modulators is optically connected to the second and third of the optical waveguides of the set; and
wherein the set of optical waveguides is configured to provide a coupling matrix or rank three or more between the optical modulators and optical propagation modes in the multimode optical fiber.

2. The apparatus of claim 1, wherein the set includes first and second optical fiber bundles, the second and third optical waveguides of the set being optical fibers of the first and second optical fiber bundles, respectively.

3. The apparatus of claim 1, wherein the set includes first and second multicore optical fibers, the first and second optical waveguides of the set being optical fibers of the first and second multicore optical fibers, respectively.

4. The apparatus of claim 1, wherein the set of optical waveguides includes at least five optical waveguides whose output ends form the lateral output array capable of end-coupling the optical waveguides of the set to the multimode optical fiber.

5. The apparatus of claim 1, wherein the optical transmitter further comprises a second set of optical waveguides and first, second, and third additional optical modulators; and
wherein output ends of the optical waveguides of the second set form a second lateral output array capable of end-coupling the optical waveguides of the second set to a multimode optical fiber in response to the second array being located to optically face an end of the multimode optical fiber; and
wherein the first additional optical modulator is optically connected to a first of the optical waveguides of the second set; and
wherein each of the second and third additional optical modulators is optically connected to the second and third of the optical waveguides of the second set.

6. The apparatus of claim 5, wherein the two arrays form a single physical array with the outputs of the optical waveguides of both sets.

7. The apparatus of claim 5, wherein the second set of optical waveguides is configured to provide a coupling matrix or rank three or more between the additional optical modulators and optical propagation modes in the multimode optical fiber.

8. The apparatus of claim 5, wherein the first set and the optical modulators connected thereto are configured to output light to the multimode optical fiber with a polarization substantially orthogonal to a polarization of light that the second set and the additional optical modulators are configured to output to the multimode optical fiber.

9. An apparatus comprising:
an optical receiver comprising a set of optical waveguides and first, second, and third optical data demodulators; and
wherein input ends of the optical waveguides of the set form a lateral input array for end-coupling the optical waveguides of the set to a multimode optical fiber in response to the array being located to optically face one end of the multimode optical fiber; and
wherein the first optical data demodulator is optically connected to a first of the optical waveguides of the set and each of the second and third optical data demodulators is optically connected to the second and third of the optical waveguides of the set; and
wherein the set of optical waveguides is configured to provide a coupling matrix or rank three or more between the optical data demodulators and optical propagation modes in the multimode optical fiber.

10. The apparatus of claim 9, wherein the set includes first and second optical fiber bundles, the second and third optical waveguides of the set being optical fibers of the first and second optical fiber bundles, respectively.

11. The apparatus of claim 9, wherein the set includes first and second multicore optical fibers, the first and second optical waveguides of the set being optical fibers of the first and second multicore optical fibers, respectively.

12. The apparatus of claim 9, wherein the set of optical waveguides includes at least five optical waveguides whose input ends form the lateral input array capable of end-coupling the optical waveguides of the set to the multimode optical fiber.

13. The apparatus of claim 9, wherein the optical receiver further comprises a second set of optical waveguides and first, second, and third additional optical data demodulators; and
wherein input ends of the optical waveguides of the second set form a second lateral input array capable of end-coupling the optical waveguides of the second set to a multimode optical fiber in response to the second array being located to optically face an end of the multimode optical fiber; and
wherein the first additional optical data demodulator is optically connected to a first of the optical waveguides of the second set; and wherein each of the second and third additional optical data demodulators is optically connected to the second and third of the optical waveguides of the second set.

14. The apparatus of claim 13, wherein the two arrays form a single physical array with the inputs of the optical waveguides of both sets.

15. The apparatus of claim 13, wherein the second set of optical waveguides is configured to provide an optical coupling matrix or rank three or more between the additional optical data demodulators and optical propagation modes in the multimode optical fiber.

16. The apparatus of claim 13, wherein the first set and the optical data demodulators connected thereto are configured to receive light from the multimode optical fiber with a polarization substantially orthogonal to a polarization of light that the second set and the additional optical modulators are configured to receive from the multimode optical fiber.

17. A method of optically transmitting digital data, comprising:
    transmitting a first data modulated optical carrier to a first optical waveguide that is end-coupled to a multimode optical fiber such that the first modulated optical carrier is transmitted preferentially to a first propagation mode of the multimode optical fiber;
    transmitting each of second and third modulated optical carriers to both second and third optical waveguides that are end-coupled to the multimode optical fiber such that the second modulated optical carrier is transmitted preferentially to a second propagation mode of the multimode optical fiber and the third modulated optical carrier is transmitted preferentially to a third propagation mode of the multimode optical fiber; and
    wherein the first, second and third propagation modes are orthogonal propagation modes in the multimode optical fiber.

18. The method of claim 17, wherein the second propagation mode has a phase that increases as a circle about the axis of the multimode optical fiber is traversed in one direction and the third propagation mode has a phase that increases as the circle is traversed in an opposite direction.

19. A method of optically receiving digital data, comprising:
    demodulating data from light received from a multimode optical fiber via a first optical waveguide end-coupled thereto such that the received light is preferentially from a first propagation mode of the multimode optical fiber;
    demodulating data from other light received from the multimode optical fiber via both second and third optical waveguides end-coupled thereto such that the other light is preferentially from a second propagation mode of the multimode optical fiber;
    demodulating data from yet other light received from the multimode optical waveguide via both the second and third optical waveguides such that the yet other light is preferentially from a third propagation mode of the multimode optical fiber; and
    wherein the first, second and third propagation modes are orthogonal propagation modes in the multimode optical fiber.

20. The method of claim 19, wherein the second propagation mode has a phase that increases on a circle about the axis of the multimode optical fiber as circle is swept out in one manner and the third propagation mode has a phase that increases on the circle about the axis of the multimode optical fiber as circle is swept out in an opposite manner.

* * * * *